United States Patent
Seo (10) Patent No.: US 7,247,987 B2
(45) Date of Patent: Jul. 24, 2007

(54) REAR PLATE FOR PLASMA DISPLAY PANEL

(75) Inventor: Jae-Chil Seo, Gyeongsang buk-do (KR)

(73) Assignee: LG Micron Ltd., Gumi (KR)

( * ) Notice: Subject to any disclaimer, the term of this patent is extended or adjusted under 35 U.S.C. 154(b) by 221 days.

(21) Appl. No.: 10/537,764

(22) PCT Filed: Dec. 9, 2002

(86) PCT No.: PCT/KR02/02316

§ 371 (c)(1),
(2), (4) Date: Jun. 6, 2005

(87) PCT Pub. No.: WO2004/053915

PCT Pub. Date: Jun. 24, 2004

(65) Prior Publication Data

US 2006/0232206 A1   Oct. 19, 2006

(30) Foreign Application Priority Data

Dec. 7, 2002   (KR)  ...................... 10-2002-0077551

(51) Int. Cl.
*H01J 17/49* (2006.01)

(52) U.S. Cl. .................. 313/582; 501/67; 501/76; 501/77; 501/79

(58) Field of Classification Search .................. 313/582
See application file for complete search history.

(56) References Cited

U.S. PATENT DOCUMENTS

| 5,300,467 A * | 4/1994 | Ishizaki et al. ................ 501/67 |
| 5,459,109 A * | 10/1995 | Lapp ............................. 501/66 |
| 5,985,460 A * | 11/1999 | Wang et al. ................. 428/426 |
| 6,271,161 B1 * | 8/2001 | Ryu et al. ...................... 501/76 |
| 2006/0119265 A1 * | 6/2006 | Cho ........................... 313/582 |

FOREIGN PATENT DOCUMENTS

| JP | 12-169764 A | 6/2000 |
| JP | 15-2692 A | 1/2003 |
| JP | 15-2693 A | 1/2003 |
| WO | WO-99/24999 A1 | 5/2000 |

\* cited by examiner

*Primary Examiner*—David Bruce
*Assistant Examiner*—Conrad R. Blease
(74) *Attorney, Agent, or Firm*—Birch, Stewart, Kolasch & Birch, LLP (57) ABSTRACT

Disclosed is a rear plate of a plasma display panel. In the rear plate, a dielectric layer or a barrier wall layer is formed by forming slurry in a tape of a green tape and then attaching the green tape to upper surfaces of electrodes and a glass substrate. Therefore, a PDP employing a rear plate according to the present invention has superior electric and optical characteristics.

4 Claims, 3 Drawing Sheets

REAR PLATE FOR PLASMA DISPLAY PANEL

TECHNICAL FIELD

The present invention relates to a rear plate of a plasma display panel.

BACKGROUND ART

As generally known in the art, a plasma display panel (PDP) is a display device having a front glass substrate and a rear glass substrate between which a discharge space is formed, so that plasma discharge may generate in the discharge space, thereby causing phosphors in the discharge space to be excited and emit light, so as to display a screen. In comparison with liquid crystal panel, the PDP can display an image at a higher speed and can easily realize a larger screen. Therefore, PDPs are employed in a field of a television with a higher quality and a larger screen.

Hereinafter, an AC PDP, which is currently the mainstream of PDPs, will be described.

A PDP includes a front plate and a rear plate assembled in parallel with each other. The front plate includes a front glass substrate, a plurality of discharge sustaining electrodes formed on a lower surface of the front glass substrate, bus electrodes formed on lower surfaces of the discharge sustaining electrodes, a dielectric layer covering the discharge sustaining electrodes and the bus electrodes, and a protection layer formed on a lower surface of the dielectric layer. Further, the rear plate includes a rear glass substrate, address electrodes formed on an upper surface of the rear glass substrate, a dielectric layer formed on upper surfaces of the address electrodes, barrier walls formed on an upper surface of the dielectric layer to form discharge cells, and phosphorous layers formed on surfaces of the barrier walls. Herein, two discharge sustaining electrodes are disposed in each discharge cell.

Therefore, the address electrodes and discharge sustaining electrodes cause discharge in the discharge cells, and ultraviolet rays generated by the discharge excites the phosphorous layer, which then emits visible rays, thereby forming a desired image on a screen.

In general, in forming barrier walls of a rear plate of a PDP, the barrier walls are preliminary formed and are then baked, as disclosed in Japanese Patent Laid-Open Nos. P9-283018 and P9-102275.

When a PDP has been manufactured by attaching a conventional rear plate as described above to a front plate, the PDP has deteriorated electrical and optical properties due to characteristics of the manufacturing method thereof.

DISCLOSURE OF THE INVENTION

Therefore, the present invention has been made in view of the above-mentioned problems, and it is an object of the present invention to provide a rear plate of a plasma display panel, which can improve electric and optical characteristics of a PDP.

According to an aspect of the present invention, there is provided a rear plate of a plasma display panel, the rear plate comprising: a glass substrate; electrodes formed in a shape of patterns on an upper surface of the glass substrate; a dielectric layer formed on upper surfaces of the electrode and the upper surface of the glass substrate; barrier walls formed in a shape of a pattern through etching on an upper surface of the dielectric layer; and phosphorous layers formed on side surfaces and bottom surfaces of the barrier walls, wherein: each of the electrodes has a thickness of 2 to 8 μm and a specific resistance of $1.0 \times 10^{-6}$ to $5.0 \times 10^{-6}$ Ωcm; the dielectric layer is made from a first mixture which includes a first filler and at least one glass powder selected from among a first glass powder and a second glass powder, the first glass powder including PbO of 30 to 80 wt %, ZnO of 0 to 20 wt %, $SiO_2$ of 0 to 20 wt %, $B_2O_3$ of 5 to 40 wt %, $Al_2O_3$ of 0 to 12 wt %, $Na_2O+K_2O+Li_2O$ of 0 to 5 wt %, and BaO+CaO+MgO+SrO of 0 to 5 wt %, the second glass powder including $Bi_2O_3$ of 36 to 84 wt %, $B_2O_3$ of 5 to 28 wt %, PbO of 0 to 46 wt %, ZnO of 0 to 30 wt %, $Al_2O_3$ of 0 to 13 wt %, $SiO_2$ of 0 to 10 wt %, $Na_2O+K_2O+Li_2O$ of 0 to 5 wt %, and BaO+CaO+MgO+SrO of 0 to 3 wt %, each of the first and second glass powders having an average particle diameter of 1 to 10 μm, a softening temperature of 390 to 550° C., and a thermal expansive coefficient of $63 \times 10^{-7}$ to $83 \times 10^{-7}$/° C., the first filler having an average particle diameter of 0.01 to 10 μm, the dielectric layer having a dielectric constant of 8 to 20, a reflectance of 50 to 80%, an etching rate of 0.01 to 1.0 μm/min with respect to inorganic acid, and a thickness of 10 to 30 μm; the barrier walls are made from a second mixture which includes a second filler, organic material, additives, and at least one glass powder selected from the group consisting of a third, fourth, and fifth glass powders, the third glass powder including ZnO of 0 to 48 wt %, $SiO_2$ of 0 to 21 wt %, $B_2O_3$ of 25 to 56 wt %, $Al_2O_3$ of 0 to 12 wt %, $Na_2O+K_2O+Li_2O$ of 0 to 38 wt %, and BaO+CaO+MgO+SrO of 0 to 15 wt %, the fourth glass powder including PbO of 25 to 65 wt %, ZnO of 0 to 35 wt %, $SiO_2$ of 0 to 26 wt %, $B_2O_3$ of 0 to 30 wt %, $Al_2O_3+SnO_2$ of 0 to 13 wt %, $Na_2O+K_2O+Li_2O$ of 0 to 19 wt %, BaO of 0 to 26 wt %, and CaO+MgO+SrO of 0 to 13 wt %, the fifth glass powder including PbO of 35 to 55 wt %, $B_2O_3$ of 18 to 25 wt %, ZnO of 0 to 35 wt %, BaO of 0 to 16 wt %, $SiO_2+Al_2O_3+SnO_2$ of 0 to 9 wt %, $CoO+CuO+MnO_2+Fe_2O_3$ of 0 to 15 wt %, $Na_2O+K_2O+Li_2O$ of 0 to 19 wt %, and CaO+MgO+SrO of 0 to 13 wt %, the third glass powder having a softening temperature of 460 to 630° C., a thermal expansive coefficient of $64 \times 10^{-7}$ to $105 \times 10^{-7}$/° C., and an average particle diameter of 0.5 to 17 μm, each of the fourth and fifth glass powders having a softening temperature of 390 to 550° C., a thermal expansive coefficient of $63 \times 10^{-7}$ to $110 \times 10^{-7}$/° C., and an average particle diameter of 0.5 to 17 μm, the second filler having an average particle diameter of 0.01 to 10 μm, the barrier walls being formed with a height of 100 to 180 μm by attaching a barrier wall layer formed in a shape of green tapes to an upper surface of the dielectric layer, firing the barrier wall layer together with the dielectric layer at a temperature between 400° C. and 700° C., and then etching the barrier wall layer, the barrier wall layer having a dielectric constant of 5 to 18, a reflectance of 40 to 80%, an etching rate of 1.0 to 50.0 μm/min with respect to inorganic acid; each of the phosphorous layers has a thickness of 10 to 50 μm; and a difference between the thermal expansive coefficients of the dielectric layer and the barrier wall layer has a percentage between 0 and 10%, and a difference between the softening temperatures of the dielectric layer and the barrier wall layer has a value between 0 and 20° C.

According to another aspect of the present invention, there is provided a rear plate of a plasma display panel, the rear plate comprising: a glass substrate; electrodes formed in a shape of patterns on an upper surface of the glass substrate; a dielectric layer formed on upper surfaces of the electrode and the upper surface of the glass substrate; barrier walls formed in a shape of a pattern through etching on an upper surface of the dielectric layer; and phosphorous layers formed on side surfaces and bottom surfaces of the barrier walls, wherein: each of the electrodes has a thickness of 2 to 8 μm and a specific resistance of $1.0 \times 10^{-6}$ to $5.0 \times 10^{-6}$ Ωcm; the dielectric layer is made from a first mixture which includes a first filler, organic material, additives, and at least one glass powder selected from among a first glass powder and a second glass powder, the first glass powder including PbO of 30 to 80 wt %, ZnO of 0 to 20 wt %, $SiO_2$ of 0 to 20 wt %, $B_2O_3$ of 5 to 40 wt %, $Al_2O_3$ of 0 to 12 wt %, $Na_2O+K_2O+Li_2O$ of 0 to 5 wt %, and BaO+CaO+MgO+SrO of 0 to 5 wt %, the second glass powder including $Bi_2O_3$ of 36 to 84 wt %, $B_2O_3$ of 5 to 28 wt %, PbO of 0 to 46 wt %, ZnO of 0 to 30 wt %, $Al_2O_3$ of 0 to 13 wt %, $SiO_2$ of 0 to 10 wt %, $Na_2O+K_2O+Li_2O$ of 0 to 5 wt %, and BaO+CaO+MgO+SrO of 0 to 3 wt %, each of the first and second glass powders having an average particle diameter of 1 to 10 μm, a softening temperature of 390 to 550° C., and a thermal expansive coefficient of $63\times10^{-7}$ to $83\times10^{-7}$/° C., the first filler having an average particle diameter of 0.01 to 10 μm, the dielectric layer having a dielectric constant of 8 to 20, a reflectance of 50 to 80%, an etching rate of 0.01 to 1.0 μm/min with respect to inorganic acid, and a thickness of 10 to 30 μm, the dielectric layer being formed in a shape of a green tape and then attached to upper surfaces of the electrodes; the barrier walls are made from a second mixture which includes a second filler, organic material, additives, and at least one glass powder selected from the group consisting of a third, fourth, and fifth glass powders, the third glass powder including ZnO of 0 to 48 wt %, $SiO_2$ of 0 to 21 wt %, $B_2O_3$ of 25 to 56 wt %, $Al_2O_3$ of 0 to 12 wt %, $Na_2O+K_2O+Li_2O$ of 0 to 38 wt %, and BaO+CaO+MgO+SrO of 0 to 15 wt %, the fourth glass powder including PbO of 25 to 65 wt %, ZnO of 0 to 35 wt %, $SiO_2$ of 0 to 26 wt %, $B_2O_3$ of 0 to 30 wt %, $Al_2O_3+SnO_2$ of 0 to 13 wt %, $Na_2O+K_2O+Li_2O$ of 0 to 19 wt %, BaO of 0 to 26 wt %, and CaO+MgO+SrO of 0 to 13 wt %, the fifth glass powder including PbO of 35 to 55 wt %, $B_2O_3$ of 18 to 25 wt %, ZnO of 0 to 35 wt %, BaO of 0 to 16 wt %, $SiO_2+Al_2O_3+SnO_2$ of 0 to 9 wt %, $CoO+CuO+MnO_2+Fe_2O_3$ of 0 to 15 wt %, $Na_2O+K_2O+Li_2O$ of 0 to 19 wt %, and CaO+MgO+SrO of 0 to 13 wt %, the third glass powder having a softening temperature of 460 to 630° C., a thermal expansive coefficient of $64\times10^{-7}$ to $105\times10^{-7}$/° C., and an average particle diameter of 0.5 to 17 μm, each of the fourth and fifth glass powders having a softening temperature of 390 to 550° C., a thermal expansive coefficient of $63\times10^{-7}$ to $110\times10^{-7}$/° C., and an average particle diameter of 0.5 to 17 μm, the second filler having an average particle diameter of 0.01 to 10 μm, the barrier walls being formed with a height of 100 to 180 μm by attaching a barrier wall layer formed in a shape of green tapes to an upper surface of the dielectric layer, firing the barrier wall layer together with the dielectric layer at a temperature between 400° C. and 700° C., and then etching the barrier wall layer, the barrier wall layer having a dielectric constant of 5 to 18, a reflectance of 40 to 80%, and an etching rate of 1.0 to 50.0 μm/min with respect to inorganic acid; each of the phosphorous layers has a thickness of 10 to 50 μm; and a difference between the thermal expansive coefficients of the dielectric layer and the barrier wall layer has a percentage between 0 and 10%, and a difference between the softening temperatures of the dielectric layer and the barrier wall layer has a value between 0 and 20° C.

According to still another aspect of the present invention, there is provided a rear plate of a plasma display panel, the rear plate comprising: a glass substrate; electrodes formed in a shape of patterns on an upper surface of the glass substrate; a dielectric layer formed on upper surfaces of the electrode and the upper surface of the glass substrate; barrier walls formed in a shape of a pattern through etching on an upper surface of the dielectric layer; and phosphorous layers formed on side surfaces and bottom surfaces of the barrier walls, wherein: each of the electrodes has a thickness of 2 to 8 μm and a specific resistance of $1.0\times10^{-6}$ to $5.0\times10^{-6}$ Ωcm; the dielectric layer is made from a first mixture which includes a first filler, organic material, additives, and at least one glass powder selected from among a first glass powder and a second glass powder, the first glass powder including PbO of 30 to 80 wt %, ZnO of 0 to 20 wt %, $SiO_2$ of 0 to 20 wt %, $B_2O_3$ of 5 to 40 wt %, $Al_2O_3$ of 0 to 12 wt %, $Na_2O+K_2O+Li_2O$ of 0 to 5 wt %, and BaO+CaO+MgO+SrO of 0 to 5 wt %, the second glass powder including $Bi_2O_3$ of 36 to 84 wt %, $B_2O_3$ of 5 to 28 wt %, PbO of 0 to 46 wt %, ZnO of 0 to 30 wt %, $Al_2O_3$ of 0 to 13 wt %, $SiO_2$ of 0 to 10 wt %, $Na_2O+K_2O+Li_2O$ of 0 to 5 wt %, and BaO+CaO+MgO+SrO of 0 to 3 wt %, each of the first and second glass powders having an average particle diameter of 1 to 10 μm, a softening temperature of 390 to 550° C., and a thermal expansive coefficient of $63\times10^{-7}$ to $83\times10^{-7}$/° C., the first filler having an average particle diameter of 0.01 to 10 μm, the dielectric layer having a dielectric constant of 8 to 20, a reflectance of 50 to 80%, an etching rate of 0.01 to 1.0 μm/min with respect to inorganic acid, and a thickness of 10 to 30 μm, the dielectric layer being formed in a shape of a green tape; the barrier walls are made from a second mixture which includes a second filler, organic material, additives, and at least one glass powder selected from the group consisting of a third, fourth, and fifth glass powders, the third glass powder including ZnO of 0 to 48 wt %, $SiO_2$ of 0 to 21 wt %, $B_2O_3$ of 25 to 56 wt %, $Al_2O_3$ of 0 to 12 wt %, $Na_2O+K_2O+Li_2O$ of 0 to 38 wt %, and BaO+CaO+MgO+SrO of 0 to 15 wt %, the fourth glass powder including PbO of 25 to 65 wt %, ZnO of 0 to 35 wt %, $SiO_2$ of 0 to 26 wt %, $B_2O_3$ of 0 to 30 wt %, $Al_2O_3+SnO_2$ of 0 to 13 wt %, $Na_2O+K_2O+Li_2O$ of 0 to 19 wt %, BaO of 0 to 26 wt %, and CaO+MgO+SrO of 0 to 13 wt %, the fifth glass powder including PbO of 35 to 55 wt %, $B_2O_3$ of 18 to 25 wt %, ZnO of 0 to 35 wt %, BaO of 0 to 16 wt %, $SiO_2+Al_2O_3+SnO_2$ of 0 to 9 wt %, $CoO+CuO+MnO_2+Fe_2O_3$ of 0 to 15 wt %, $Na_2O+K_2O+Li_2O$ of 0 to 19 wt %, and CaO+MgO+SrO of 0 to 13 wt %, the third glass powder having a softening temperature of 460 to 630° C., a thermal expansive coefficient of $64\times10^{-7}$ to $105\times10^{-7}$/° C., and an average particle diameter of 0.5 to 17 μm, each of the fourth and fifth glass powders having a softening temperature of 390 to 550° C., a thermal expansive coefficient of $63\times10^{-7}$ to $110\times10^{-7}$/° C., and an average particle diameter of 0.5 to 17 μm, the second filler having an average particle diameter of 0.01 to 10 μm; each of the phosphorous layers has a thickness of 10 to 50 μm; and a difference between the thermal expansive coefficients of the dielectric layer and the barrier wall layer has a percentage between 0 and 10%, and a difference between the softening temperatures of the dielectric layer and the barrier wall layer has a value between 0 and 20° C., wherein a barrier wall layer formed in a shape of green tapes, which has a dielectric constant of 5 to 18, a reflectance of 40 to 80%, and an etching rate of 1.0 to 50.0 μm/min with respect to inorganic acid, is integrated with the dielectric layer to form a lamination of dielectric layer/barrier wall layer, and the lamination of dielectric layer/barrier wall layer is attached to the upper surfaces of the electrodes and the glass substrate, is baked at a temperature between 400° C. and 700° C., and is then etched, so that the barrier walls are formed with a height of 100 to 180 μm.

Herein, each of the barrier walls has at least two different layers having different etching rates with respect to inorganic acid.

In a rear plate of a plasma display panel according to the present invention, a dielectric layer or a barrier wall layer is formed by forming slurry in a tape of a green tape and then attaching the green tape to upper surfaces of electrodes and a glass substrate. Therefore, a PDP employing a rear plate according to the present invention has superior electric and optical characteristics.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Hereinafter, a rear plate of a plasma display panel according to preferred embodiments of the present invention will be described in detail with reference to the accompanying drawings.

Figure 1:
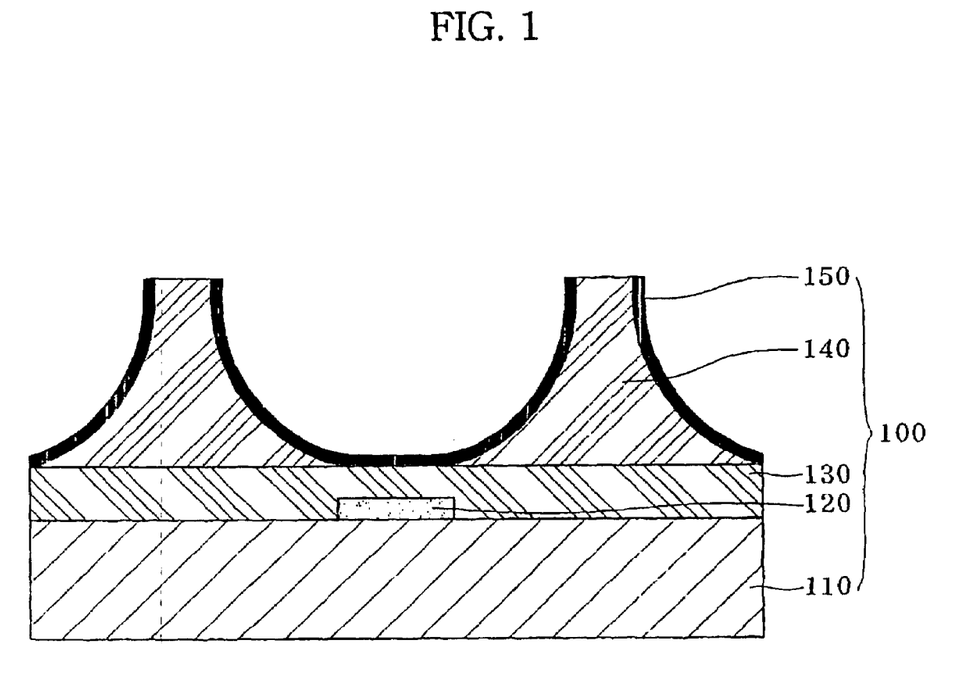
FIG. 1 is a sectional view of a rear plate of a plasma display panel according to a first embodiment of the present invention.

FIG. 1 is a sectional view of a rear plate of a plasma display panel according to a first embodiment of the present invention.

As shown in FIG. 1, a rear plate 100 of a plasma display panel (hereinafter, referred to as "PDP") according to the present embodiment includes a glass substrate 110, electrodes 120 formed in a shape of a pattern and spaced at a predetermined interval from each other on an upper surface of the glass substrate 110, a dielectric layer 130 formed on upper surfaces of the electrode 120 and the upper surface of the glass substrate 110, barrier walls 140 formed on an upper surface of the dielectric layer 130 and spaced a predetermined interval from each other, and phosphorous layers 150 formed on side surfaces and bottom surfaces of the barrier walls 140.

Since the barrier walls 140 is formed through etching, the barrier walls must have a proper etching rate for etching solution and the electrodes 120 and the dielectric layer 130 must have resistance to the etching solution. In order to meet the requirements described above, each of the functional layers of the rear plate 100 according to the present embodiment has a specific composition, which will be described hereinafter.

First Embodiment

In the rear plate 100 according to the first embodiment of the present invention, the dielectric layer 130 is formed by a screen printing method, the barrier walls are formed in a shape of green tapes, and then the dielectric layer 130 and the barrier walls are simultaneously baked. This process will be described in detail hereinafter.

The electrodes 120 formed on the upper surface of the glass substrate has a thickness of 2~8 μm. That is, photosensitive paste for the electrodes, which has a specific resistance of $2.5 \times 10^{-6}$ to $4.0 \times 10^{-6}$ Ωcm, is screen-printed on the upper surface of the glass substrate 110, is dried, and is then subjected to photolithography and firing, thereby forming the electrodes 120. When the electrodes have a specific resistance of lower than $2.5 \times 10^{-6}$, the low resistance enables the electrodes to process an address signal without noise. However, the electrodes must be made from gold or silver with high purity, which increases the manufacturing cost for the electrodes. In contrast, when the electrodes have a specific resistance of larger than $4 \times 10^{-6}$ Ωcm, such problems as increase of an address driving voltage are caused.

The dielectric layer 130 is made from mixture of a first filler and at least one glass powder selected from among a first glass powder and a second glass powder. The dielectric layer 130 has a thickness of 10 to 30 μm.

The first glass powder comprises PbO of 30 to 80 wt %, ZnO of 0 to 20 wt %, $SiO_2$ of 0 to 20 wt %, $B_2O_3$ of 5 to 40 wt %, $Al_2O_3$ of 0 to 12 wt %, $Na_2O+K_2O+Li_2O$ of 0 to 5 wt %, and $BaO+CaO+MgO+SrO$ of 0 to 5 wt %. The second glass powder comprises $Bi_2O_3$ of 36 to 84 wt %, $B_2O_3$ of 5 to 28 wt %, PbO of 0 to 46 wt %, ZnO of 0 to 30 wt %, $Al_2O_3$ of 0 to 13 wt %, $SiO_2$ of 0 to 10 wt %, $Na_2O+K_2O+Li_2O$ of 0 to 5 wt %, and $BaO+CaO+MgO+SrO$ of 0 to 3 wt %. The first filler includes at least one selected from the group consisting of $TiO_2$, $ZrO_2$, ZnO, $Al_2O_3$, BN, mullite, and MgO.

Each of the first and second glass powders has a softening temperature of 390 to 550° C. When their softening temperature is smaller than 390° C., the dielectric layer 130 may flow in steps of firing the phosphorous layers and attaching the front plate and the rear plate of the PDP to each other after the barrier walls 140 are formed, thereby deteriorating correctness in the measurements of the PDP. In contrast, when the softening temperature is larger than 550° C., the firing temperature of the dielectric layer 130 becomes so high as to change the measurements of the glass substrate 110, thereby causing it difficult to control the measurements of the glass substrate 110.

It is preferred that each of the first and second glass powders has an average particle diameter of 1 to 10 μm. When each of the first and second glass powders has an average particle diameter of less than 1 μm, they have a reduced workability. In contrast, when each of the first and second glass powders has an average particle diameter of more than 10 μm, the dielectric layer 130 is not sufficiently compacted while being baked, so that the dielectric layer 130 may be porous.

Also, each of the first and second glass powders preferably has a thermal expansive coefficient of $63 \times 10^{-7}$ to $83 \times 10^{-7}/°$ C. When the thermal expansive coefficient is smaller than $63 \times 10^{-7}/°$ C., the glass substrate 110 may be convexly bent. In contrast, when the thermal expansive coefficient is larger than $83 \times 10^{-7}/°$ C., the glass substrate 110 may be concavely bent or the surface of the dielectric layer 130 may crack. However, even when each of the first and second glass powders preferably has a thermal expansive coefficient of $95 \times 10^{-7}/°$ C., the thermal expansive coefficient can be lowered to $83 \times 10^{-7}/°$ C. by mixing a proper amount of the first filler with the first and second glass powders. Therefore, it will do if each of the first and second glass powders preferably has a thermal expansive coefficient of $63 \times 10^{-7}$ even up to $95 \times 10^{-7}/°$ C.

It is preferred that each of the first and second glass powders has a dielectric constant of 11 to 26. When the dielectric constant of the dielectric layer 130 is smaller than 11, it is difficult to transfer a signal of the electrode 120 to a discharge space defined by the barrier walls 140. In contrast, when the dielectric constant of the dielectric layer 130 is larger than 26, the PDP has too slow a response speed when the PDP is driven. Meanwhile, when each of the first and second glass powders has a dielectric constant of at least 6, the dielectric constant of the dielectric layer 130 can be elevated up to 11 by means of the first filler. Therefore, it is also preferred that each of the first and second glass powders has a dielectric constant of 6 to 26.

The first filler preferably has an average particle diameter of 0.01 to 10 μm. Further, it is preferred that a volumetric ratio of the first filler with respect to the glass powder in the dielectric layer is 0.05 to 0.67. When the volumetric ratio is less than 0.05, the dielectric layer 130 has a reflectance of at most 50%, thereby preventing the PDP from employing a dielectric layer having a reflectance of at least 50% which is necessary in order to enable the PDP to have an improved brightness. Further, in the case in which the volumetric ratio is more than 0.67, when the softening temperature of the glass powder is low, the dielectric constant is high and thus the response seed is slow. In contrast, when the softening temperature of the glass powder is high, the degree of firing of the dielectric layer 130 deteriorates, so that it is difficult for the dielectric layer 130 to have a resistance to etching and the dielectric layer 130 has a dielectric constant of at most 11.

The dielectric layer 130 having the ingredients as described above has a dielectric constant of 8 to 20, a reflectance of 50 to 80%, and an etching rate of 0.1 to 1.0 μm/min with respect to inorganic acid. When the etching rate of the dielectric layer 130 is smaller than 0.1 μm/min, the firing temperature of the dielectric layer 130 may rise above 700° C., thereby deforming the glass substrate 110. In contrast, when the etching rate is larger than 1.0 μm/min, the powder has a reduced resistance to etching, so that even the dielectric layer 130 and the electrodes 120 may be etched when the barrier wall 140 is etched. When the electrode 120 has been damaged by etching, the electric resistance of the electrode 120 increases.

The first filler can be classified into two kinds of oxides, which have weak and strong chemical durability with respect to acid-based etching solution, respectively. The first kind of oxide having a weak chemical durability with respect to acid-based etching solution reacts with glass powder while it is baked, thereby deteriorating the chemical durability of the reacted glass powder. In contrast, the second kind of oxide having a strong chemical durability with respect to acid-based etching solution reacts with glass powder while it is baked, thereby increasing the chemical durability of the reacted glass powder.

Further, when the dielectric layer 130 includes too much first filler, quantity of the first filler, which does not react with the oxide, increases, so that firing strength deteriorates. Therefore, it is preferred that a ratio of volume of the first filler with respect to volume of the glass powder in the dielectric layer 130 is not larger than 0.67. The less the quantity of the first filler is, the more the white degree of the dielectric layer 130 deteriorates. However, since some PDPs may have a dielectric layer 130 with an unlimited white degree, it is unnecessary to define a lower limit of the ratio of volume of the first filler with respect to volume of the glass powder in the dielectric layer 130.

The dielectric layer 130 may have defect due to either repetition of printing and drying processes or screen plate making. The defect due to screen plate making include irregular thickness of meshes, non-uniform surface state of meshes, stains of meshes, etc., which may cause defect such as pinholes or height difference on the dielectric layer 130. Further, the material of the dielectric layer 130 may be insufficiently filled under end portions of the electrodes 120 due to a curl phenomenon in which the end portions of the electrodes 120 formed through photolithography and firing are curled up while they are being baked. Then, bubbles may be generated between the electrodes 120 and the dielectric layer 130 to lower the resistance to voltage, thereby causing insulation breaking, while a PDP operates. Therefore, in forming the dielectric layer 130, either a printing method or a green tape attachment method, which will be described later, must be employed according to material or characteristics of its shape.

The barrier walls 140 are formed on the upper surface of the dielectric layer 130. Specifically, a slurry is formed in a shape of green tapes having a predetermined thickness and is then attached to the upper surface of the dielectric layer 130. Then, the attached green tapes are subjected to photolithography and etching, thereby the barrier walls 140 having a shape of patterns.

The barrier wall 140 is made in a shape of green tapes by adding organic material and additive to mixture of a second filler and at least one glass powder selected from the group consisting of the third, fourth, and fifth glass powders.

The third glass powder comprises ZnO of 0 to 48 wt %, $SiO_2$ of 0 to 21 wt %, $B_2O_3$ of 25 to 56 wt %, $Al_2O_3$ of 0 to 12 wt %, $Na_2O+K_2O+Li_2O$ of 0 to 38 wt %, and BaO+CaO+MgO+SrO of 0 to 15 wt %. The fourth glass powder comprises PbO of 25 to 65 wt %, ZnO of 0 to 35 wt %, $SiO_2$ of 0 to 26 wt %, $B_2O_3$ of 0 to 30 wt %, $Al_2O_3+SnO_2$ of 0 to 13 wt %, $Na_2O+K_2O+Li_2O$ of 0 to 19 wt %, BaO of 0 to 26 wt %, and CaO+MgO+SrO of 0 to 13 wt %. The fifth glass powder comprises PbO of 35 to 55 wt %, $B_2O_3$ of 18 to 25 wt %, ZnO of 0 to 35 wt %, BaO of 0 to 16 wt %, $SiO_2+Al_2O_3+SnO_2$ of 0 to 9 wt %, $CoO+CuO+MnO_2+Fe_2O_3$ of 0 to 15 wt %, $Na_2O+K_2O+Li_2O$ of 0 to 19 wt %, and CaO+MgO+SrO of 0 to 13 wt %. The second filler includes at least one selected from the group consisting of $TiO_2$, $ZrO_2$, ZnO, $Al_2O_3$, BN, mullite, and MgO.

Herein, the third glass powder has a softening temperature of 460 to 630° C., and each of the fourth and fifth glass powders has a softening temperature of 390 to 550° C. In the case where the softening temperature is smaller than 460° C. and 390° C., respectively, when the phosphorous layers 150 are baked after the barrier walls 140 are formed or after the front and rear plates are attached to each other, the barrier walls 140 may be deformed so that the barrier walls 140 may have much irregular heights and their upper portions may have much irregular widths. In contrast, in a case where the softening temperature is larger than 630° C. and 550° C., respectively, the firing temperature of the barrier wall 140 increases, thereby causing it difficult to control the measurements of the glass substrate 110.

The third glass powder has a thermal expansive coefficient of $64 \times 10^{-7}$ to $105 \times 10^{-7}/°$ C., and each of the fourth and fifth glass powders preferably has a thermal expansive coefficient of $63 \times 10^{-7}$ to $110 \times 10^{-7}/°$ C. When the thermal expansive coefficient is smaller than $63 \times 10^{-7}/°$ C. and $63 \times 10^{-7}/°$ C., respectively, the glass substrate 110 may be convexly bent. In contrast, when the thermal expansive coefficient is larger than $105 \times 10^{-7}/°$ C. or $110 \times 10^{-7}/°$ C., respectively, the glass substrate 110 may be concavely bent or the surface of the glass substrate 110 may crack. However, since the thermal expansive coefficient can be changed by adjusting the amount of the filler in the barrier wall 140, each of the third, fourth, and fifth glass powders may preferably have a thermal expansive coefficient of $63 \times 10^{-7}$ even up to $110 \times 10^{-7}/°$ C.

Each of the third, fourth, and fifth glass powders has an average particle diameter of 0.5 to 17 μm. When the glass powder has an average particle diameter of smaller than 0.5 μm, it is difficult to make paste for the barrier wall from the glass powder. In contrast, when the conductive metal powder has an average particle diameter of larger than 17 μm, it is difficult to enable the barrier walls to be sufficiently compact through firing after forming the barrier walls.

Each of the third, fourth, and fifth glass powders has a dielectric constant of 5 to 20. In the case where the dielectric constant is smaller than 5, a drive voltage characteristic is deteriorated when a manufactured PDP is driven. In contrast, in the case where the dielectric constant is larger than 20, crosstalk and erroneous discharge may occur when the manufactured PDP is driven.

Further, the second filler has an average particle diameter of at most 10 μm. Also, a volumetric ratio of the first filler with respect to the glass powder for the barrier walls is 0.05 to 0.67, which will be described later.

Organic material and additive are added to the material for the barrier walls as described above, so as to form a slurry with a viscosity of 500 to 40000 cP (centi-poise) in a shape of green tapes, thereby forming preliminary barrier walls. Then, the preliminary barrier walls in a shape of green tapes are attached to the upper surface of the dielectric layer 130 through lamination, and are then simultaneously baked together with the dielectric layer 130 at a temperature above 400° C. Herein, it is preferred that the preliminary barrier walls in a shape of green tapes have a thickness of 100 o 180 μm.

In order to simultaneously bake the dielectric layer 130 and the barrier walls, a difference between the thermal expansive coefficients of them must have a value of at most 10%, and a difference between the softening temperatures of them must have a value of at most 20° C. If the difference between the thermal expansive coefficients of them has a value larger than 10%, the dielectric layer 130 and the barrier walls may be separated from each other, thereby allowing bubbles to be formed between them, when they have been simultaneously baked. Further, the glass substrate 110 may be bent due to the difference between the thermal expansive coefficients of them, thereby preventing the rear plate from being attached to the front plate.

Further, when the difference between the softening temperatures of them has a value larger than 20° C., end portions of the dielectric layer 130 and the barrier walls may be curled up or may come off, thereby allowing bubbles to be formed between them. When too many bubbles exist in an interface between the dielectric layer 130 and the barrier walls, each of the dielectric layer 130 and the barrier walls may have a sparse internal structure, thereby having large fragility and deteriorated strength. Further, when too many bubbles exist in an interface between the dielectric layer 130 and the barrier walls, the bubbles may come into the dielectric layer 130 and the barrier walls while the dielectric layer 130 and the barrier walls are baked, so that the dielectric layer 130 and the barrier walls may have deteriorated properties and insulation breaking may occur while a PDP operates.

In order to prepare the material for the barrier walls in a form of slurry, organic materials and additives are necessary. The organic materials include a binding agent which provides strength to the barrier walls, a solvent which dissolves the material of the barrier walls and provides fluidity necessary in milling and casting to the barrier walls, and a plasticizer which improves workability of the barrier walls. The additives include a defoaming agent for reducing generation of bubbles, a dispersing agent for aiding dispersion of inorganic material, dyes, and lubricating oil.

The binding agent includes at least one selected from the group consisting of Polyvinyl butyral, Polyvinyl alcohol, Polyvinyl acetate, Poly Methyl Metaacrylate, Poly ethyl acrylate, Poly acrylic acid, Ethyl Cellulose, Hydroxyethyl cellulose, Methyl cellulose, Carboxymethyl cellulose, Acrylic ester, and Ammonium Polyacrylate. The solvent includes at least one selected from the group consisting of Ethyl alcohol, n-Butyl alcohol, Toluene, Water, Methyl alcohol, n-Propyl alcohol, Isopropyl alcohol, Ethylene Glycol, Benzaldehide, Ethylacetate, Cyclohexane, Isopropyl acetate, n-Octyl alcohol, Benzyl alcohol, Glycerol, Acetone, Methyl Ethyl Keton, Propionic acid, n-Octanoic acid, n-Hexane, O-Xylene, MIBK, Xylene, and Butanyl. The plasticizer includes at least one selected from the group consisting of Water, Ethylene Glycol, Diethylene Glycol, Tetraethylene glycol, Glycerine, Dimethyl phtalate, Dibutyl phtalate, Benzyl butyl phthalate, poly propylene glycol, Phosphate, Phthalate, Glycol ether, and Polyethylen glycol.

As the additives, typical additives are used.

The binding agent must experience a complete thermal decomposition through the drying and firing process. If the binding agent is not thermally decomposed, carbon residue may exist in the barrier walls, thereby greatly decreasing an insulation strength of the barrier walls. The solvent is selected in consideration of viscosity of slurry and drying speed according to the thickness of the green tapes and casting, solubility and speed of dissolution of adhesive agent and other organic materials, etc. The plasticizer must be selected in consideration of compatibility of the plasticizer with the binding agent. If a plasticizer shows an incompatibility with respect to the binding agent according to temperature increase, the plasticizer escapes out of the green tapes during the drying process, so that the green tapes have fragility. The organic material is selected in consideration of properties such as viscosity in milling, viscosity in casting, thickness of the green tapes, strength of the green tapes, percentage of elongation, and workability. When the quantity of the organic material is too much, defoamation process must be performed for long time. In contrast, when the quantity of the organic material is too little, an efficiency of milling for preparing the slurry deteriorates.

Figure 2:
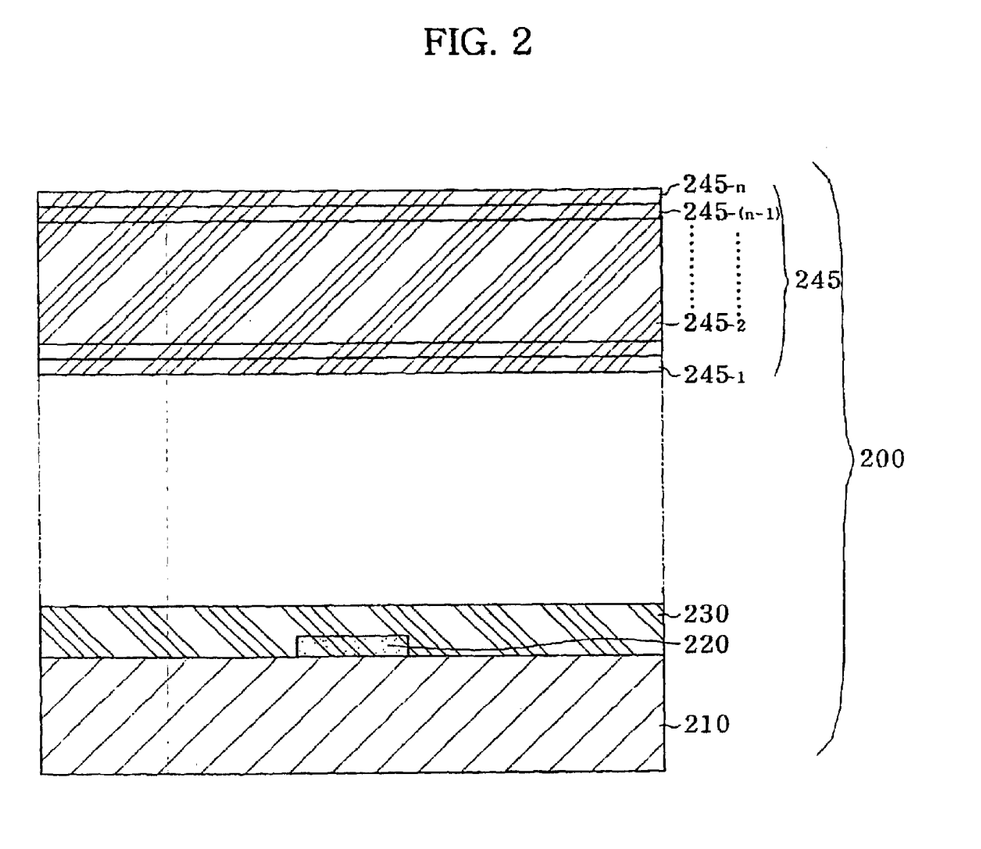
FIG. 2 is a sectional view of a rear plate of a plasma display panel according to a second embodiment of the present invention.

As shown in FIG. 2, each barrier wall 245 may include a plurality of wall layers $245_{-1}, 245_{-2}, \ldots 245_{-(n-1)}, 245_{-n}$ which are prepared from different materials having different etching rates to inorganic acid. Herein, if the multiple wall layers $245_{-1}, 245_{-2}, \ldots, 245_{-(n-1)}, 245_{-n}$ constituting the barrier wall 245 are named first, second, $\ldots, (n-1)^{th}$, and $n^{th}$ wall layers, respectively, the $(n-1)^{th}$ wall layer has an etching rate with respect to inorganic acid, which is larger than or equal to that of the $n^{th}$ wall layer. As a result, when the barrier wall 245 is formed through etching, side surfaces of the barrier wall 245 can be formed nearly vertically, thereby forming a rectangular discharge space.

Further, each of the wall layers $245_{-1}, 245_{-2}, \ldots, 245_{-(n-1)}, 245_{-n}$ must have a thickness corresponding to 5% to 95% of the entire thickness of the barrier wall 245. If any of the wall layers has a thickness, which is either smaller than 5% or larger than 95% of the entire thickness of the barrier wall 245, the thickness of that wall layer is too small or too large to have an effect by the adjustment of etching rate as described above, thereby making it useless to form the barrier wall 245 from at least two kinds of different materials.

When barrier walls are formed in a shape of green tapes from mixture in which organic material and additives are added to the material of the barrier walls, which has the composition and properties described above according to the first embodiment of the present invention, the barrier walls have a dielectric constant of 5 to 18, a reflectance of 40 to 80%, and an etching rate of 1.0 to 50.0 μm/min.

Further, the phosphorous layers 150 include red, green, and blue phosphorous layers formed on side and bottom surfaces of the barrier walls 140, each of the phosphorous layers having a thickness of at least 10 μm.

Second Embodiment

FIG. 2 is a sectional view of a rear plate of a plasma display panel according to the second embodiment of the present invention.

As shown, a dielectric layer 230 and barrier walls 245 each are arranged in a shape of green tapes, the dielectric layer 230 is formed on upper surfaces of an electrode 220 and a glass substrate 210, and then the barrier walls 245 are formed on an upper surface of the dielectric layer 230, so that a rear plate 200 according to the second embodiment of the present invention is completed.

The electrode 220 according to the second embodiment is the same as the electrode according to the first embodiment, and the dielectric layer 230 according to the second embodiment is made from the same material as that of the dielectric layer 130 according to the first embodiment. However, in forming the dielectric layer 230 according to the second embodiment, organic material and additives are added to material of the dielectric layer 130 according to the first embodiment, which is then formed in a shape of green tapes and attached to the upper surfaces of the electrode 220 and the glass substrate 210. Further, the barrier walls 245 according to the second embodiment is formed on the upper surface of the dielectric layer 230 in the same manner as that according to the first embodiment, and the dielectric layer 230 and the barrier walls 245 are simultaneously baked at a temperature above 400° C. as those according to the first embodiment.

The other constructions according to the second embodiment are the same as those according to the first embodiment.

Third Embodiment

Figure 3:
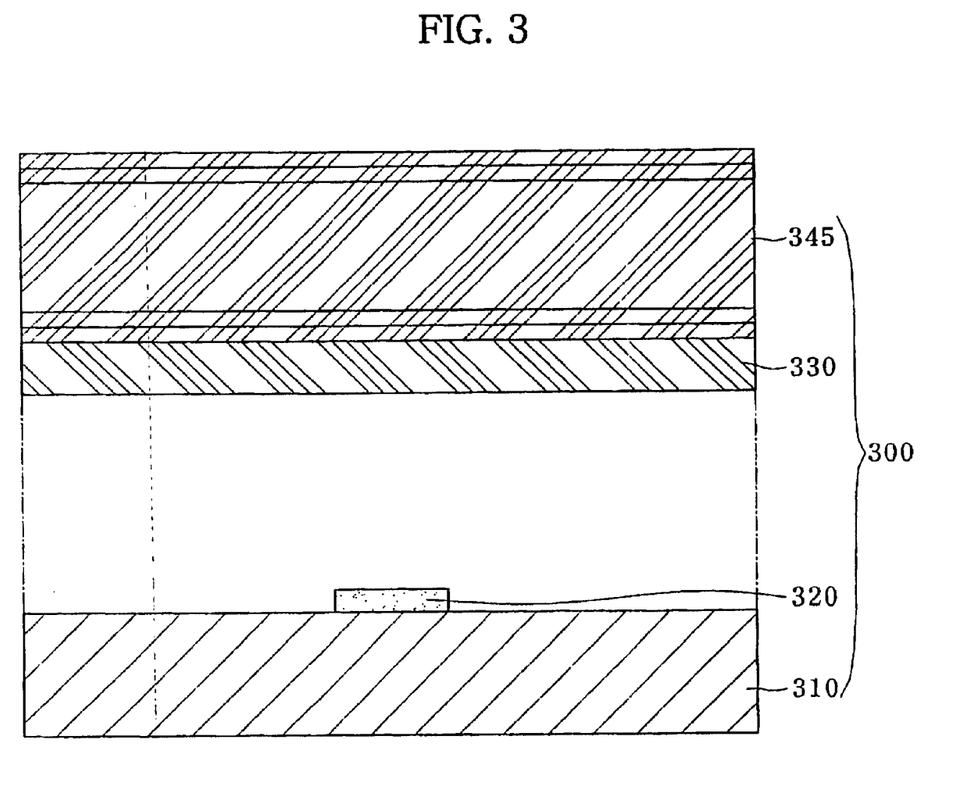
FIG. 3 is a sectional view of a rear plate of a plasma display panel according to a third embodiment of the present invention.

FIG. 3 is a sectional view of a rear plate of a plasma display panel according to the third embodiment of the present invention.

As shown, composition and characteristics of each functional layer of a rear plate according to the third embodiment of the present invention is the same as the composition and characteristics of each functional layer of the rear plate according to the second embodiment of the present invention. In description of only the differences between them, a dielectric layer 330 and barrier walls 345 are prepared in a shape of green tapes having a thickness of 10 to 30 μm and 100 to 180 μm, respectively, and are integrated with each other. Thereafter, the dielectric layer 330 is attached to upper surfaces of electrodes 320 and a glass substrate 310. Then, they are baked at a temperature above 400° C., so that the dielectric layer 330 and the barrier walls 345 are completed.

The other constructions according to the third embodiment are the same as those according to the second embodiment.

The etching rate described in the first, second, and third embodiments is defined by an equation, etching rate={(M1−M2)/6.25}×100. In this equation, M1 implies mass of a substrate having a size of 2.5 cm×2.5 cm, on the entire surface of which material for the dielectric layer or the barrier walls has been applied and then baked. M2 implies mass of the substrate, measured after the substrate is wet-etched for two minutes, is washed for one minute by ultrasonic wave and then for one minute by flowing water, and is then dried.

Next, measured properties of each functional layer of the rear plate manufactured as described above will be described.

Experiment 1

EPH-200TR5611 photosensitive electrode paste having a specific resistance of $2.7 \times 10^{-6}$ Ωcm, made by Taiyo Ink company of Japan, was applied with a thickness of 4~6 μm on an upper surface of a glass substrate by means of a polyester screen Mask of #200 mesh and was then dried for fifteen minutes at 90° C., thereby forming an electrode layer. Thereafter, the electrode layer formed on the glass substrate was exposed to light and was then developed, so that electrodes having a shape of patterns were formed. In the exposure step, the electrode layer was exposed to light of 500 mJ emitted by a mirror reflected parallel beam illuminator (MRPBI) equipped with a mercury lamp. Also, in the development step, solution containing sodium carbonate of 0.4 wt % at a temperature of 30° C. was sprayed for thirty seconds at a pressure of 0.2 Mpa, and then pure water at 25° C. was sprayed for thirty seconds at a pressure of 0.1 Mpa onto the electrode substrate. Then, the electrodes dried after being developed were baked for fifteen minutes at a maximum temperature of 550° C.

A dielectric layer with a thickness of 22 μm was formed on upper surfaces of the electrodes through screen printing using a SUS screen Mask of #200 mesh, and was then dried for ten minutes at 120° C. Table 1 shows composition of the dielectric layer.

TABLE 1

Composition of the dielectric layer according to experiment 1:

| | Gradients of glass powder (wt %) | | | | | | | 1st |
|---|---|---|---|---|---|---|---|---|
| Class | PbO | SiO$_2$ | B2O3 | Al$_2$O$_3$ | ZnO | NaO | BaO | filler |
| Dielectric layer | 43.5 | 16 | 8 | 2.5 | 29 | 1 | | TiO$_2$ + ZnO$_2$ + Al$_2$O$_3$ |

Glass powder of the dielectric layer having the composition shown in table 1 has a softening temperature of 460° C. When the dielectric layer has been baked for fifteen minutes at a maximum temperature of 530° C., the dielectric layer has a dielectric constant of 12.5, a reflectance of 70%, an etching rate of 0.5 μm/min with respect to inorganic acid.

The barrier walls were formed in a shape of green tapes with three layers and were then laminated on the upper surface of the dielectric layer. Table 2 shows composition of each layer of the barrier walls.

TABLE 2

Composition of each layer of the barrier walls according to experiment 1:

| | | Gradients of glass powder (wt %) | | | | | | | | |
|---|---|---|---|---|---|---|---|---|---|---|
| Class | | PbO | ZnO | SiO$_2$ | B$_2$O$_3$ | Al$_2$O$_3$ + ZnO$_2$ | Li$_2$O + Na$_2$O + K$_2$O | BaO | CaO + MgO + SrO | Filler |
| Partition wall | 1st layer | 40 | 22 | 6 | 18 | 2 | 12 | 0 | 1 | TiO$_2$ + ZnO$_2$ + Al$_2$O$_3$ |
| | 2nd layer | 41 | 30 | 5 | 18 | 2 | 2 | 0 | 2 | ZrO$_2$ + Al$_2$O$_3$ |
| | 3rd layer | 55 | 20 | 0 | 16 | 1 | 5 | 1 | 2 | TiO$_2$ + ZrO$_2$ + Al$_2$O$_3$ |

In forming the barrier walls in a shape of green tapes, B-44 and B-48, which are binders having different molecular weights from among PolyMethyl Meta Acrylate-series (PMMA-series) binders manufactured by Rohm and Hass company, were employed, mixture of ethyl alcohol and toluene by 1:1 was employed as solvent, and dimethyl phtalate was employed as a plasticizer. Further, menhaden fish oil was employed as a dispersing agent, and stearic acid was employed as a lubricating agent. Herein, a binder of 6 wt %, a solvent of 30 wt %, a plasticizer of 8 wt %, a dispersing agnet of 1 wt %, and a lubricating agent of 0.3 wt % were added in the powder mixture of 100 wt % for the barrier walls, in which glass powder and filler are mixed.

After the additives described were added, the barrier walls were formed in a shape of green tapes with three layers by means of a tape caster. Then, each barrier wall was solidified to have a total thickness of 196 μm, in which a thickness ratio of (the first layer):(the second layer):(the third layer) is 1:(0.9):(0.8). Thereafter, the barrier walls having a shape of green tapes were attached to the upper surface of the dielectric layer through laminating by a roller at a temperature of 105° C. and a pressure of 0.3 Mpa, and were then baked together with the dielectric layer at a maximum temperature of 530° C. for 15 minutes. Then, each of the formed barrier walls were formed to have a thickness of 150 μm.

Table 3 shows properties of the barrier walls formed as described above.

TABLE 3

Measured properties of each layer of the barrier wall according to experiment 1:

| Class | | Softening temperature (° C.) | Thermal expansive coefficient (×10$^{-7}$/° C.) | Average particle diameter (μm) | Dielectric constant | Reflection ratio(%) | Etching rate (μm/Min) |
|---|---|---|---|---|---|---|---|
| Partition wall | 1$^{st}$ layer | 40 | 22 | 6 | 18 | 2 | 12 |
| | 2$^{nd}$ layer | 41 | 30 | 5 | 18 | 2 | 2 |
| | 3$^{rd}$ layer | 55 | 20 | 0 | 16 | 1 | 5 |

Photosensitive material was applied on the upper surfaces of the barrier walls, was exposed to light by means of a photo mask, and was then developed. Thereafter, inorganic acid was sprayed onto the developed photosensitive material at a pressure of 2 kgf/cm², so that the barrier walls were completely formed in a shape of patterns through a selective wet etching. Then, each barrier wall had an uppermost portion having a width of 50 μm and a lowermost portion having a width of 120 μm.

Thereafter, red, green, and blue phosphors were printed with a thickness of 17 μm on side and bottom surfaces of the barrier walls, thereby forming phosphorous layers covered on the barrier walls.

Table 4 shows properties of PDPs employing a rear plate according to experiment 1 and a conventional rear plate, respectively.

TABLE 4

Measured properties of PDPs employing a rear plate according to experiment 1 and a conventional rear plate:

| Class | | PDP employing conventional rear plate | PDP employing rear plate of experiment 1 |
|---|---|---|---|
| | Pitch | 250 μm | 250 μm |
| | Number of firings of rear plate | 4 times | 3 times |
| | Discharge space | 100% | 106% |
| Optical properties | White Peak brightness | 100% | 132% |
| | Color temperature(K) | 8500 | 8802 |
| | Contrast | 100% | 128% |
| Electrical properties | Voltage margin | 100% | 145% |
| | Power consumption | 100% | 89% |
| | Module efficiency | 100% | 125% |
| reliability | High temp./low temp. erroneous discharge | No | No |
| | vibration/drop test | No progressive defect | No progressive defect |
| Other properties | noise (dB) | 100% | 75% |

As apparent from table 4, a PDP employing a rear plate according to experiment 1 of the present invention has shown improvement in comparison with a PDP employing a conventional rear plate, which includes 6% increase of discharge space, 32% increase of white brightness, 302 k increase of color temperature, 28% increase of contrast, 45% of voltage margin, 11% decrease of power consumption, 25% increase of PDP efficiency, and 25% decrease of noise. In table 4, "Pitch" implies a distance between centers of adjacent two barrier walls.

Experiment 2

Electrodes in experiment 2 are the same as the electrodes in experiment 1, excepting that the firing temperature in experiment 2 is 570° C.

An electrode layer formed on a glass substrate was exposed to light and developed, so that electrodes having a shape of patterns were formed. In the exposure step, the electrode layer was exposed to light of 500 mJ emitted by a mirror reflected parallel beam illuminator equipped with a mercury lamp. Also, in the development step, solution containing sodium carbonate of 1.0 wt % at a temperature of 30° C. was sprayed for thirty seconds at a pressure of 0.2 Mpa, and then pure water at 30° C. was sprayed for thirty seconds at a pressure of 0.1 Mpa onto the electrode substrate. Then, the electrodes dried after being developed were baked for fifteen minutes at a maximum temperature of 570° C.

Thereafter, the dielectric layer was formed in a form of a green tape and was then laminated on the upper surfaces of the electrodes. Table 5 shows composition of the dielectric layer.

TABLE 5

Composition of the dielectric layer in experiment 2

| | Glass powder (wt %) | | | | | | | |
|---|---|---|---|---|---|---|---|---|
| Class | PbO | $SiO_2$ | $B_2O_3$ | $Al_2O_3$ | ZnO | NaO | BaO | Filler |
| Dielectric layer | 60 | 15 | 19 | 6 | | | | $TiO_2$ + $ZnO_2$ + $Al_2O_3$ |

Glass powder of the dielectric layer having the composition shown in table 5 has a softening temperature of 450° C. In order to prepare the dielectric layer in a shape of a green tape, poly vinyl buryral and B98 manufactured by Monsanto co., Ltd. were employed as a binder, mixture including MEK, ethyl alcohol, and n-butyl alcohol at a weight ratio of 3:1:1 was employed as a solvent, dibutyl phthalate was employed as a plasticizer, and SN-9228, manufactured by Sanocof co., Ltd., was employed as a dispersing agent. Herein, a binder of 6 wt %, a solvent of 30 wt %, a plasticizer of 1 wt %, and a dispersing agnet of 8 wt % were added in the powder mixture of 100 wt % for the dielectric layer, in which glass powder and filler are mixed.

In forming the dielectric layer, slurry including the above-mentioned additives and having a viscosity of 8000±500 cps was prepared in a form of a green tape with a thickness of 37 μm, and was then attached to upper surfaces of the electrodes and the glass substrate through laminating by a roller at a temperature of 95° C. and a pressure of 0.25 Mpa.

Thereafter, the attached green tape was baked at a maximum temperature of 530° C. for 15 minutes. Then, the completed dielectric layer had a dielectric constant of 18.0, a reflectance of 73%, an etching rate of 0.3 μm/min with respect to inorganic acid.

Thereafter, barrier walls equal to those according to experiment 1 were attached to the upper surface of the dielectric layer through laminating by a roller at a temperature of 105° C. and a pressure of 0.3 Mpa, and were then baked together with the dielectric layer at a maximum temperature of 530° C. for 15 minutes. In this case, the dielectric layer was formed to have a thickness of 25 μm, and each of the formed barrier walls were formed to have a thickness of 150 μm, in which the first, second, and third layers of each barrier wall have 56 μm, 50 μm, 44 μm, respectively. Also, the widths of the uppermost and lowermost portions of each barrier wall, and the pitch between barrier walls were arranged to be the same as those in experiment 1.

Thereafter, phosphorous layers were formed in the same manner as that in experiment 1, excepting that each phosphorous layer was formed to have a thickness of 14 μm.

Table 6 shows properties of PDPs employing a rear plate according to experiment 2 and a conventional rear plate, respectively.

TABLE 6

Measured properties of PDPs employing a rear plate according to experiment 2 and a conventional rear plate:

| | Class | PDP employing conventional rear plate | PDP employing rear plate of experiment 2 |
|---|---|---|---|
| | Pitch | 250 μm | 250 μm |
| | Number of firings of rear plate | 4 times | 3 times |
| | Discharge space | 100% | 106% |
| Optical properties | White Peak brightness | 100% | 130% |
| | Color temperature(K) | 8500 | 8796 |
| | Contrast | 100% | 125% |
| Electrical properties | Voltage margin | 100% | 137% |
| | Power consumption | 100% | 89% |
| | Module efficiency | 100% | 121% |
| reliability | High temp./low temp. erroneous discharge | No | No |
| | vibration/drop test | No progressive defect | No progressive defect |
| Other properties | noise (dB) | 100% | 75% |

As apparent from table 6, like the PDP employing a rear plate according to experiment 1 of the present invention, a PDP employing a rear plate according to experiment 2 of the present invention has shown improvement in electric and optical characteristics and reliability, in comparison with a PDP employing a conventional rear plate.

Experiment 3

Electrodes in experiment 3 are the same as the electrodes in experiment 2.

An electrode layer and a barrier wall layer were prepared in a shape of a green tape, respectively, and were then integrated with each other, thereby forming a lamination of electrode layer/barrier wall layer having a form of a green tape.

Thereafter, the lamination of electrode layer/barrier wall layer was laminated on the upper surfaces of the electrodes. Tables 7 and 8 show composition of the dielectric layer and the barrier wall layer, respectively.

TABLE 7

Composition of the dielectric layer in experiment 3:

| | Gradients of glass powder (wt %) | | | | | | | |
|---|---|---|---|---|---|---|---|---|
| Class | PbO | $SiO_2$ | $B_2O_3$ | $Al_2O_3$ | ZnO | NaO | BaO | Filler |
| Dielectric layer | 53 | 13 | 6 | 12 | 10 | 0 | 2 | $TiO_2$ + $Al_2O_3$ |

Glass powder of the dielectric layer having the composition shown in table 7 has a softening temperature of 535° C. In order to prepare the dielectric layer in a shape of a green tape, PVB and B98 manufactured by Monsanto co., Ltd. were employed as a binder, mixture including toluene, ethanol, and n-butyl alcohol was employed as a solvent, dibutyl phthalate was employed as a plasticizer, and SN-9228, manufactured by Sanoncof co., Ltd., was employed as a dispersing agent. Herein, a binder of 12 wt %, a solvent of 20 wt %, a plasticizer of 1 wt %, and a dispersing agent of 4 wt % were added in the powder mixture of 100 wt % for the dielectric layer, in which glass powder and filler are mixed. The solvent of 20 wt % includes toluene of 4 wt %, ethanol of 1 wt %, and n-butyl alcohol of 1 wt %, mixed therein. As a result, a dielectric layer was formed in a shape of a green tape having a viscosity of 8000±500 cps.

Next, the dielectric layer formed as described above was baked at a maximum temperature of 550° C. for 15 minutes. Then, the completed dielectric layer was observed to have a dielectric constant of 13.2, a reflectance of 69%, an etching rate of 0.12 μm/min with respect to inorganic acid.

Hereinafter, a method of integrating the dielectric layer and the barrier wall layer with each other will be briefly described.

After the dielectric layer was cast, the first and second layers of the barrier wall layer were sequentially cast on the upper surface of the dielectric layer, and then each layer was preliminary dried at 75° C., so that a lamination of dielectric layer/barrier wall layer having a shape of an integrated green tape was formed. Then, the lamination of dielectric layer/barrier wall layer was completely dried at 145° C., and was then attached to the upper surfaces of the electrodes and the glass substrate by a roller at a pressure of 0.3 MPa and

TABLE 8

Composition of the barrier wall in experiment 3:

Gradients of glass powder (wt %)

| Class | PbO | ZnO | $SiO_2$ | $B_2O_3$ | $Al_2O_3 + ZnO_2$ | $Li_2O + Na_2O + K_2O$ | BaO | CaO + Mg + SrO | Filler |
|---|---|---|---|---|---|---|---|---|---|
| 1st layer | 0 | 19 | 6 | 37 | 0 | 38 | 0 | 0 | $TiO_2 + ZnO_2 + Al_2O_3$ |
| 2nd layer | 0 | 22 | 21 | 30 | 5 | 21 | 1 | 0 | $ZrO_2 + Al_2O_3$ |

In order to prepare the dielectric layer having a composition as shown in Table 8 in a shape of a green tape, PVB manufactured by Monsanto co., Ltd. was employed as a binder, mixture including toluene and isopropyl alcohol was employed as a solvent, dibutyl phthalate manufactured by Yakuri company was employed as a plasticizer, and KD-1 manufactured by ICI Chemical was employed as a dispersing agent.

Herein, a binder of 10 wt %, a solvent of 20 wt %, a plasticizer of 20 wt %, and a dispersing agent of 1 wt % were added in the powder mixture of 100 wt % for the barrier walls, in which glass powder and filler are mixed. The solvent of 20 wt % includes toluene of 8 wt % and isopropyl alcohol of 2 wt %, mixed therein. As a result, the barrier walls were formed in a shape of green tapes having a viscosity of 9500±500 cps. In this case, each of the barrier walls consists of two overlapping layers.

Table 9 shows properties of the barrier wall according to experiment 3.

temperature of 105° C. Thereafter, the lamination of dielectric layer/barrier wall layer was baked for fifteen minutes at a maximum temperature of 550° C., so that the dielectric layer was formed to have a thickness of 23 μm and the barrier wall layer was formed to have a thickness of 130 μm. In the barrier wall layer, the first layer was formed to have a thickness of 103 μm and the second layer was formed to have a thickness of 27 μm.

Thereafter, barrier walls were formed by working the partition layer in the same manner as in experiment 1, so that each barrier wall had an uppermost portion with a width of 60 μm and a lowermost portion with a width of 130 μm.

Further, phosphorous layers were formed in the same manner as in experiment 1. Each phosphorous layer was formed to have a thickness of 13 μm.

Table 10 shows properties of PDPs employing a rear plate according to experiment 3 and a conventional rear plate, respectively.

TABLE 9

Properties of the barrier wall according to experiment 3:

| | class | Softening temperature (° C.) | Thermal expansive coeffic. ($\times 10^{-7}$/° C.) | Average particle dia. (μm) | Dielectric const. | Reflection ratio (%) | Etching rate (μm/Min) |
|---|---|---|---|---|---|---|---|
| Partition wall | 1st layer | 475 | 79 | 3.5 | 20 | 65 | 42.0 |
| | 2nd layer | 481 | 93 | 9.1 | 17 | 67 | 30.9 |

TABLE 10

Measured properties of PDPs employing a rear plate according to experiment 3 and a conventional rear plate:

| Class | | PDP employing conventional rear plate | PDP employing rear plate of experiment 3 |
|---|---|---|---|
| | Pitch | 220 μm | 220 μm |
| | Number of firings of rear plate | 4 times | 3 times |
| | Discharge space | 100% | 105% |
| Optical properties | White Peak brightness | 100% | 125% |
| | Color temperature(K) | 8500 | 8647 |
| | Contrast | 100% | 120% |
| Electrical properties | Voltage margin | 100% | 125% |
| | Power consumption | 100% | 92% |
| | Module efficiency | 100% | 115% |
| reliability | High temp./low temp. erroneous discharge | No | No |
| | vibration/drop test | No progressive defect | No progressive defect |
| Other properties | noise (dB) | 100% | 75% |

As apparent from table 10, like the PDPs employing rear plates according to experiments 1 and 2, a PDP employing a rear plate according to experiment 3 of the present invention has shown improvement in electric and optical characteristics and reliability, in comparison with a PDP employing a conventional rear plate.

Further, as noted from experiments 1, 2, and 3 of the present invention, in a PDP employing a rear plate according to the present invention, each barrier wall has a narrower lower portion than that in a PDP employing the conventional rear plate, so that the discharge space increases 5% and the number of firing times can be reduced.

INDUSTRIAL APPLICABILITY

As can be seen from the foregoing, in a rear plate of a plasma display panel according to the present invention, a dielectric layer or a barrier wall layer is formed by forming slurry in a tape of a green tape and then attaching the green tape to upper surfaces of electrodes and a glass substrate. Therefore, a PDP employing a rear plate according to the present invention has superior electric and optical characteristics.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A rear plate of a plasma display panel, the rear plate comprising:

a glass substrate;

electrodes formed in a shape of patterns on an upper surface of the glass substrate;

a dielectric layer formed on upper surfaces of the electrode and the upper surface of the glass substrate;

barrier walls formed in a shape of a pattern through etching on an upper surface of the dielectric layer; and phosphorous layers formed on side surfaces and bottom surfaces of the barrier walls, wherein:

the electrodes has a thickness of 2 to 8 μm and a specific resistance of $1.0 \times 10^{-6}$ to $5.0 \times 10^{-6}$ Ωcm;

the dielectric layer is made from a first mixture which includes a first filler and at least one glass powder selected from among a first glass powder and a second glass powder, the first glass powder including PbO of 30 to 80 wt %, ZnO of 0 to 20 wt %, $SiO_2$ of 0 to 20 wt %, $B_2O_3$ of 5 to 40 wt %, $Al_2O_3$ of 0 to 12 wt %, $Na_2O+K_2O+Li_2O$ of 0 to 5 wt %, and BaO+CaO+MgO+SrO of 0 to 5 wt %, the second glass powder including $Bi_2O_3$ of 36 to 84 wt %, $B_2O_3$ of 5 to 28 wt %, PbO of 0 to 46 wt %, ZnO of 0 to 30 wt %, $Al_2O_3$ of 0 to 13 wt %, $SiO_2$ of 0 to 10 wt %, $Na_2O+K_2O+Li_2O$ of 0 to 5 wt %, and BaO+CaO+MgO+SrO of 0 to 3 wt %, each of the first and second glass powders having an average particle diameter of 1 to 10 μm, a softening temperature of 390 to 550° C., and a thermal expansive coefficient of $63 \times 10^{-7}$ to $83 \times 10^{-7}$/° C., the first filler having an average particle diameter of 0.01 to 10 μm, the dielectric layer having a dielectric constant of 8 to 20, a reflectance of 50 to 80%, an etching rate of 0.01 to 1.0 μm/min with respect to inorganic acid, and a thickness of 10 to 30 μm;

the barrier walls are made from a second mixture which includes a second filler, organic material, additives, and at least one glass powder selected from the group consisting of a third, fourth, and fifth glass powders, the third glass powder including ZnO of 0 to 48 wt %, $SiO_2$ of 0 to 21 wt %, $B_2O_3$ of 25 to 56 wt %, $Al_2O_3$ of 0 to 12 wt %, $Na_2O+K_2O+Li_2O$ of 0 to 38 wt %, and BaO+CaO+MgO+SrO of 0 to 15 wt %, the fourth glass powder including PbO of 25 to 65 wt %, ZnO of 0 to 35 wt %, $SiO_2$ of 0 to 26 wt %, $B_2O_3$ of 0 to 30 wt %, $Al_2O_3+SnO_2$ of 0 to 13 wt %, $Na_2O+K_2O+Li_2O$ of 0 to 19 wt %, BaO of 0 to 26 wt %, and CaO+MgO+SrO of 0 to 13 wt %, the fifth glass powder including PbO of 35 to 55 wt %, $B_2O_3$ of 18 to 25 wt %, ZnO of 0 to 35 wt %, BaO of 0 to 16 wt %, $SiO_2+Al_2O_3+SnO_2$ of 0 to 9 wt %, $CoO+CuO+MnO_2+Fe_2O_3$ of 0 to 15 wt %, $Na_2O+K_2O+Li_2O$ of 0 to 19 wt %, and CaO+MgO+SrO of 0 to 13 wt %, the third glass powder having a softening temperature of 460 to 630° C., a thermal expansive coefficient of $64 \times 10^{-7}$ to $105 \times 10^{-7}$/° C., and an average particle diameter of 0.5 to 17 μm, each of the fourth and fifth glass powders having a softening temperature of 390 to 550° C., a thermal expansive coefficient of $63 \times 10^{-7}$ to $110 \times 10^{-7}$/° C., and an average particle diameter of 0.5 to 17 μm, the second filler having an average particle diameter of 0.01 to 10 μm, the barrier walls being formed with a height of 100 to 180 μm by attaching a barrier wall layer formed in a shape of green tapes to an upper surface of the dielectric layer, firing the barrier wall layer together with the dielectric layer at a temperature between 400° C. and 700° C., and then etching the barrier wall layer, the barrier wall layer having a dielectric constant of 5 to 18, a reflectance of 40 to 80%, an etching rate of 1.0 to 50.0 μm/min with respect to inorganic acid;

the phosphorous layers have a thickness of 10 to 50 μm; and a difference between the thermal expansive coefficients of the dielectric layer and the barrier wall layer has a percentage between 0 and 10%, and a difference between the softening temperatures of the dielectric layer and the barrier wall layer has a value between 0 and 20° C.

2. A rear plate of a plasma display panel, the rear plate comprising:
a glass substrate;
electrodes formed in a shape of patterns on an upper surface of the glass substrate;
a dielectric layer formed on upper surfaces of the electrode and the upper surface of the glass substrate;
barrier walls formed in a shape of a pattern through etching on an upper surface of the dielectric layer; and
phosphorous layers formed on side surfaces and bottom surfaces of the barrier walls, wherein:
the electrodes has a thickness of 2 to 8 μm and a specific resistance of $1.0 \times 10^{-6}$ to $5.0 \times 10^{-6}$ Ωcm;
the dielectric layer is made from a first mixture which includes a first filler, organic material, additives, and at least one glass powder selected from among a first glass powder and a second glass powder, the first glass powder including PbO of 30 to 80 wt %, ZnO of 0 to 20 wt %, $SiO_2$ of 0 to 20 wt %, $B_2O_3$ of 5 to 40 wt %, $Al_2O_3$ of 0 to 12 wt %, $Na_2O+K_2O+Li_2O$ of 0 to 5 wt %, and BaO+CaO+MgO+SrO of 0 to 5 wt %, the second glass powder including $Bi_2O_3$ of 36 to 84 wt %, $B_2O_3$ of 5 to 28 wt %, PbO of 0 to 46 wt %, ZnO of 0 to 30 wt %, $Al_2O_3$ of 0 to 13 wt %, $SiO_2$ of 0 to 10 wt %, $Na_2O+K_2O+Li_2O$ of 0 to 5 wt %, and BaO+CaO+MgO+SrO of 0 to 3 wt %, each of the first and second glass powders having an average particle diameter of 1 to 10 μm, a softening temperature of 390 to 550° C., and a thermal expansive coefficient of $63 \times 10^{-7}$ to $83 \times 10^{-7}$/° C., the first filler having an average particle diameter of 0.01 to 10 μm, the dielectric layer having a dielectric constant of 8 to 20, a reflectance of 50 to 80%, an etching rate of 0.01 to 1.0 μm/min with respect to inorganic acid, and a thickness of 10 to 30 μm, the dielectric layer being formed in a shape of a green tape and then attached to upper surfaces of the electrodes;
the barrier walls are made from a second mixture which includes a second filler, organic material, additives, and at least one glass powder selected from the group consisting of a third, fourth, and fifth glass powders, the third glass powder including ZnO of 0 to 48 wt %, $SiO_2$ of 0 to 21 wt %, $B_2O_3$ of 25 to 56 wt %, $Al_2O_3$ of 0 to 12 wt %, $Na_2O+K_2O+Li_2O$ of 0 to 38 wt %, and BaO+CaO+MgO+SrO of 0 to 15 wt %, the fourth glass powder including PbO of 25 to 65 wt %, ZnO of 0 to 35 wt %, $SiO_2$ of 0 to 26 wt %, $B_2O_3$ of 0 to 30 wt %, $Al_2O_3+SnO_2$ of 0 to 13 wt %, $Na_2O+K_2O+Li_2O$ of 0 to 19 wt %, BaO of 0 to 26 wt %, and CaO+MgO+SrO of 0 to 13 wt %, the fifth glass powder including PbO of 35 to 55 wt %, $B_2O_3$ of 18 to 25 wt %, ZnO of 0 to 35 wt %, BaO of 0 to 16 wt %, $SiO_2+Al_2O_3+SnO_2$ of 0 to 9 wt %, $CoO+CuO+MnO_2+Fe_2O_3$ of 0 to 15 wt %, $Na_2O+K_2O+Li_2O$ of 0 to 19 wt %, and CaO+MgO+SrO of 0 to 13 wt %, the third glass powder having a softening temperature of 460 to 630° C., a thermal expansive coefficient of $64 \times 10^{-7}$ to $105 \times 10^{-7}$/° C., and an average particle diameter of 0.5 to 17 μm, each of the fourth and fifth glass powders having a softening temperature of 390 to 550° C., a thermal expansive coefficient of $63 \times 10^{-7}$ to $110 \times 10^{-7}$/° C., and an average particle diameter of 0.5 to 17 μm, the second filler having an average particle diameter of 0.01 to 10 μm, the barrier walls being formed with a height of 100 to 180 μm by attaching a barrier wall layer formed in a shape of green tapes to an upper surface of the dielectric layer, firing the barrier wall layer together with the dielectric layer at a temperature between 400° C. and 700° C., and then etching the barrier wall layer, the barrier wall layer having a dielectric constant of 5 to 18, a reflectance of 40 to 80%, and an etching rate of 1.0 to 50.0 μm/min with respect to inorganic acid;
the phosphorous layers have a thickness of 10 to 50 μm; and
a difference between the thermal expansive coefficients of the dielectric layer and the barrier wall layer has a percentage between 0 and 10%, and a difference between the softening temperatures of the dielectric layer and the barrier wall layer has a value between 0 and 20° C.

3. A rear plate of a plasma display panel, the rear plate comprising:
a glass substrate;
electrodes formed in a shape of patterns on an upper surface of the glass substrate;
a dielectric layer formed on upper surfaces of the electrode and the upper surface of the glass substrate;
barrier walls formed in a shape of a pattern through etching on an upper surface of the dielectric layer; and
phosphorous layers formed on side surfaces and bottom surfaces of the barrier walls, wherein:
the electrodes has a thickness of 2 to 8 μm and a specific resistance of $1.0 \times 10^{-6}$ to $5.0 \times 10^{-6}$ Ωcm;
the dielectric layer is made from a first mixture which includes a first filler, organic material, additives, and at least one glass powder selected from among a first glass powder and a second glass powder, the first glass powder including PbO of 30 to 80 wt %, ZnO of 0 to 20 wt %, $SiO_2$ of 0 to 20 wt %, $B_2O_3$ of 5 to 40 wt %, $Al_2O_3$ of 0 to 12 wt %, $Na_2O+K_2O+Li_2O$ of 0 to 5 wt %, and BaO+CaO+MgO+SrO of 0 to 5 wt %, the second glass powder including $Bi_2O_3$ of 36 to 84 wt %, $B_2O_3$ of 5 to 28 wt %, PbO of 0 to 46 wt %, ZnO of 0 to 30 wt %, $Al_2O_3$ of 0 to 13 wt %, $SiO_2$ of 0 to 10 wt %, $Na_2O+K_2O+Li_2O$ of 0 to 5 wt %, and BaO+CaO+MgO+SrO of 0 to 3 wt %, each of the first and second glass powders having an average particle diameter of 1 to 10 μm, a softening temperature of 390 to 550° C., and a thermal expansive coefficient of $63 \times 10^{-7}$ to $83 \times 10^{-7}$/° C., the first filler having an average particle diameter of 0.01 to 10 μm, the dielectric layer having a dielectric constant of 8 to 20, a reflectance of 50 to 80%, an etching rate of 0.01 to 1.0 μm/min with respect to inorganic acid, and a thickness of 10 to 30 μm, the dielectric layer being formed in a shape of a green tape;
the barrier walls are made from a second mixture which includes a second filler, organic material, additives, and at least one glass powder selected from the group consisting of a third, fourth, and fifth glass powders, the third glass powder including ZnO of 0 to 48 wt %, $SiO_2$ of 0 to 21 wt %, $B_2O_3$ of 25 to 56 wt %, $Al_2O_3$ of 0 to 12 wt %, $Na_2O+K_2O+Li_2O$ of 0 to 38 wt %, and BaO+CaO+MgO+SrO of 0 to 15 wt %, the fourth glass powder including PbO of 25 to 65 wt %, ZnO of 0 to 35 wt %, $SiO_2$ of 0 to 26 wt %, $B_2O_3$ of 0 to 30 wt %, $Al_2O_3+SnO_2$ of 0 to 13 wt %, $Na_2O+K_2O+Li_2O$ of 0 to 19 wt %, BaO of 0 to 26 wt %, and CaO+MgO+SrO of 0 to 13 wt %, the fifth glass powder including PbO of 35 to 55 wt %, $B_2O_3$ of 18 to 25 wt %, ZnO of 0 to 35 wt %, BaO of 0 to 16 wt %, $SiO_2+Al_2O_3+SnO_2$ of 0 to 9 wt %, $CoO+CuO+MnO_2+Fe_2O_3$ of 0 to 15 wt %, $Na_2O+K_2O+Li_2O$ of 0 to 19 wt %, and CaO+MgO+SrO of 0 to 13 wt %, the third glass powder having a softening temperature of 460 to 630° C., a thermal expansive coefficient of $64 \times 10^{-7}$ to $105 \times 10^{-7}$/° C., and an average particle diameter of 0.5 to 17 µm, each of the fourth and fifth glass powders having a softening temperature of 390 to 550° C., a thermal expansive coefficient of $63 \times 10^{-7}$ to $110 \times 10^{-7}/°$ C., and an average particle diameter of 0.5 to 17 µm, the second filler having an average particle diameter of 0.01 to 10 µm;

the phosphorous layers have a thickness of 10 to 50 µm; and a difference between the thermal expansive coefficients of the dielectric layer and the barrier wall layer has a percentage between 0 and 10%, and a difference between the softening temperatures of the dielectric layer and the barrier wall layer has a value between 0 and 20° C., wherein a barrier wall layer formed in a shape of green tapes, which has a dielectric constant of 5 to 18, a reflectance of 40 to 80%, and an etching rate of 1.0 to 50.0 µm/min with respect to inorganic acid, is integrated with the dielectric layer to form a lamination of dielectric layer/barrier wall layer, and the lamination of dielectric layer/barrier wall layer is attached to the upper surfaces of the electrodes and the glass substrate, is baked at a temperature between 400° C. and 700° C., and is then etched, so that the barrier walls are formed with a height of 100 to 180 µm.

4. A rear plate of a plasma display panel as claimed in any of claims 1 to 3, wherein each of the barrier walls has at least two different layers having different etching rates with respect to inorganic acid.

* * * * *